United States Patent
Braun et al.

(10) Patent No.: US 7,896,396 B2
(45) Date of Patent: Mar. 1, 2011

(54) AUTOMOTIVE VEHICLE AND ALSO SUPPORT ARRANGEMENT

(75) Inventors: Marco Braun, Lug (DE); Volker Doll, Ranschbach (DE); Steve Kober, Treuen (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 427 days.

(21) Appl. No.: 11/630,487

(22) PCT Filed: Jun. 29, 2005

(86) PCT No.: PCT/EP2005/007194
§ 371 (c)(1),
(2), (4) Date: Apr. 15, 2009

(87) PCT Pub. No.: WO2006/000465
PCT Pub. Date: Jan. 5, 2006

(65) Prior Publication Data
US 2009/0200784 A1    Aug. 13, 2009

(30) Foreign Application Priority Data
Jun. 29, 2004   (DE) .................. 10 2004 032 449

(51) Int. Cl.
*B62D 1/16* (2006.01)

(52) U.S. Cl. ...................................... 280/779
(58) Field of Classification Search .............. 280/779; 296/70, 187.01
See application file for complete search history.

(56) References Cited

U.S. PATENT DOCUMENTS

| 3,887,273 | A | 6/1975 | Griffiths et al. |
| 4,740,780 | A | 4/1988 | Brown et al. |
| 5,563,620 | A | 10/1996 | Terai et al. |
| 2002/0056982 | A1* | 5/2002 | Brownlee et al. ............. 280/779 |
| 2003/0173799 | A1* | 9/2003 | Wendland et al. ....... 296/187.01 |

FOREIGN PATENT DOCUMENTS

| DE | 34 19 002 | 11/1985 |
| DE | 198 13 300 | 10/1999 |
| JP | 03157265 A * | 7/1991 |

* cited by examiner

*Primary Examiner* — Faye M. Fleming
(74) *Attorney, Agent, or Firm* — Fay Kaplun & Marcin, LLP (57) ABSTRACT

An automotive vehicle includes a support arrangement for supporting the steering column, an air-conditioning unit, a head-up display (HUD) and/or pedals. The automotive vehicle has a window arch which extends below the windscreen in the region between the two A-columns of the automotive vehicle. In order to facilitate assembly, the window arch has, on the engine compartment-side, recesses in order to be able to fix the support arrangement or a corresponding instrument panel module from the engine compartment.

20 Claims, 8 Drawing Sheets

AUTOMOTIVE VEHICLE AND ALSO SUPPORT ARRANGEMENT

FIELD OF INVENTION

The present invention relates to an automotive vehicle and also a support arrangement for supporting the steering column and/or the pedals of an automotive vehicle and also to the automotive vehicle itself.

BACKGROUND INFORMATION

It is thus known for example to provide a transverse support in automotive vehicles in the region of the front wall which separates the engine compartment and the automotive vehicle interior from each other. This transverse support serves, on the one hand, for supporting the instrument panel, in addition heavy elements, such as for example the air-conditioning unit, passenger airbag etc. can be supported here. It is now problematic that, on the one hand, the stability of this transverse support is desired, on the other hand, the assembly of this support, in particular if it supports parts such as air-conditioning units etc. is very complex.

Because of the strong competition in the automobile industry, it is necessary in addition to optimise the constructions such that rapid assembly in the automobile factory is possible. However, the quality of the automotive vehicles should hereby be ensured and the installation conditions for the operators should also be good. However this can be problematic in particular when automotive vehicles are becoming more and more complex.

This is problematic in particular in the case of automotive vehicles with so-called head-up displays (HUD). These head-up displays project important travel information, such as e.g. vehicle speed or engine rpm, directly onto the windscreen so that this information can be read by the driver at close range without having to divert his gaze away from the windscreen.

However, this interaction with the windscreen presents the vehicle constructors with new demands. The complex projection device must preferably be able to be tested, even before its assembly, in interaction with other electronic components in the automotive vehicle in order to prevent complex re-assembly operations. On the other hand, a rapid and secure connection of the projection device to the windscreen should be made possible in order that a picture is produced without shakiness, even with vehicle vibration.

SUMMARY OF INVENTION

The present invention relates to a support arrangement or an automotive vehicle which contains this support arrangement, elements, such as steering, pedals, head-up display, air-conditioning unit etc., being retained in a stable manner, on the one hand, but as great a degree of freedom being ensured nevertheless during the interior configuration of an automotive vehicle and a simple assembly of the total arrangement being provided.

It is the general concept of the application to provide facility of assembly for a support arrangement or a support module.

This is achieved in that the window arch, on the side orientated towards the engine compartment of the automotive vehicle, has recesses which enable simple fitting (e.g. screwing-on) of a support arrangement or of an HUD (head-up display).

It is therefore possible for the first time to completely prefabricate the support arrangement or a corresponding module (including instrument panel cover) and to undertake rapid assembly (just-in-time). The shell hereby already contains a window arch, the window arch is not (as in prior art) part of the module. As a result, the rigidity of the structure is significantly improved without the assembly becoming more complicated.

On the one hand, an automotive vehicle with a support arrangement for supporting the steering column and/or pedals is thus claimed, the automotive vehicle having a window arch which extends below a windscreen in the region between the two A-columns of the automotive vehicle. In order to replace a transverse support which is additional to the window arch and extends normally between the two A-columns of a vehicle, the support arrangement hereby has a first and a second strut, the initial points of the struts being disposed in the region of the steering column and the end point of the first strut being situated in the region of the driver-side A-column and the end point of the second strut in the region of the central console and the support arrangement being mounted on the window arch.

The corresponding support arrangement for installing in an automotive vehicle has therefore for example a first and a second strut, the initial points of the struts being provided in a mounting region for a steering column and the end point of the first strut being able to be fitted in the region of a driver-side A-column of an automotive vehicle and the end point of the second strut in the region of the central console of the automotive vehicle and the support arrangement being able to be mounted on a window arch in addition in the region of the steering column mounting region. The window arch has, according to the invention, recesses of such a type that the support arrangement can be mounted on the window arch from the engine compartment of the automotive vehicle.

In this embodiment, the actual bearing function of two (diagonal) struts is ensured, which struts extend, on the one hand, between the driver-side A-column and the window arch and, on the other hand, between window arch and central console, the two struts hereby meeting in the region of a mounting for a steering column which is situated in the region of the window arch. The diagonal struts are hereby displaced towards the engine compartment so far that sufficient knee-room is present correspondingly also on the driver-side.

For example a tripod (termed "support arrangement" above) serves therefore to receive the steering. This differs from known solutions in the diagonal arrangement of the supports on the central tunnel and A-column. As a result, no torsion is introduced into the tripod during vertical loading on the steering wheel so that open profiles also can be used for the tripod without loss of rigidity. Since the diagonal struts are mainly subjected to pressure, also fibre-reinforced plastic materials can be used in addition to conventional metal materials without, in comparison with known transverse support concepts, lower steering wheel inherent frequencies or higher deflections being reached upon vertical loading of the steering wheel.

It is possible furthermore to integrate possible components, such as HUD (head-up display), pedals and power brakes.

Advantageously, the support arrangement has a receiving space for the projection device of an HUD in the connection region to the window arch. As a result, this sensitive projection device is surrounded by the correspondingly stable support arrangement and is hence protected. The HUD is therefore mounted on the support arrangement between the window arch and the steering shaft exit. This assembly space is consequently used optimally.

It should be ensured that, with the corresponding instrument panel or with the instrument panel support, an opening is provided correspondingly on the upper side thereof in order to allow the projection beam of the HUD to pass through. It is particularly advantageous hereby that for example the instrument panel support can have a symmetrical configuration: the HUD should be fitted on the driver-side and a passenger airbag on the passenger-side at the respectively corresponding position. It is possible in this way to provide the ventilation channels to be symmetrical for example.

The automotive vehicle according to the invention preferably contains a windscreen, a window arch which extends below the windscreen and also a transverse support which extends at least in regions across the vehicle width, the transverse support being able to be connected via at least one support element to the window arch of the automotive vehicle, a projection device of a head-up display (HUD) being provided in the intermediate space between transverse support and window arch, and the window arch having recesses of such a type that the projection device of the HUD can be fixed on the window arch from the engine compartment of the automotive vehicle.

There is hereby understood by "window arch", the support which is provided on the lower edge of the windscreen (sometimes termed also "scuttle"). This is provided in practically every automotive vehicle and is independent of the "transverse support" which is present for this purpose and provided normally additionally, said transverse support extending in the region of the vehicle interior.

The "transverse support" can, in the sense of the present invention, extend across the entire width of the automotive vehicle or alternatively can also extend merely over a partial region. This is preferably in the driver-side region, in this case the transverse support (as part of a so-called "tripod") can serve in regions merely for the purpose of supporting the steering column or the pedals in this region so that, in the passenger-side region, the assembly space can be used more flexibly as a result of the transverse support being omitted in the region there.

Between window arch and transverse support, the projection device of a head-up display is provided and projects a corresponding image onto the windscreen. The projection device has a mounting device on its side orientated away from the transverse support (i.e. towards the window arch). The window arch in turn has recesses so that, from the engine compartment (i.e. through the window arch or the front wall), fixing of the projection device is possible. This has major advantages for the assembly. An instrument panel module can be provided with already pre-assembled projection device, also the data-technological connections can be provided already in advance and be correspondingly tested. The instrument panel module can in this respect be provided already finished with the instrument panel cover since the final fixing of the projection device is effected from the engine compartment. For this purpose, it is particularly advantageous that the projection device is mounted so as to "float" and the final secure fixing from the engine compartment serves merely for definition of the end position of the projection device without additional coordination processes being required here. As a result, it is ensured in addition that secure fixing to the window arch is provided. This window arch is likewise connected securely to the windscreen. As a result of the fact that both components are mounted or vibrate hence "synchronously", an image of the projection device on the windscreen is achieved essentially without shakiness.

The instrument panel module according to the invention therefore contains a transverse support which extends at least in regions across the automotive vehicle width, a support element for connecting the transverse support to a window arch and also a projection device of a head-up display which is fitted in the region of the transverse support and support element, a mounting device for connecting the projection device to the window arch being provided on the side of the projection device which is orientated away from the transverse support. This mounting device can be a snap-on connection etc. but preferably is a screw opening which enables secure screwing to the window arch.

The window arch is normally configured as a metal part. Alternatively, of course also other stable materials are possible, such as glass fibre-reinforced plastic materials etc. The window arch is furthermore configured as a hollow profile for reasons of lightweight construction and stability. The window arch hereby normally has recesses in the form of holes which enable "bridging over" of the hollow space in the window arch and hence connection of the projection device on the side of the window arch which is orientated away from the engine compartment. Of course these recesses can also be provided in the form of lateral bulges of the window arch, it merely being important that through these recesses or openings a secure connection of the projection device to the window arch can be effected from the engine compartment.

In the case of the method according to the invention for assembling an automotive vehicle, an automotive vehicle body which contains a window arch below the region of a windscreen to be mounted, is connected therefore to an instrument panel module which already contains a projection device of an HUD. The instrument panel module is firstly connected securely to the window arch and/or to further parts of the body and in addition the projection device of the HUD is securely connected to the window arch, from the engine compartment, by mounting means, preferably screws.

The instrument panel support is configured to be self-supporting by means of ribs or by the connection of the air channels. On the instrument panel support, passenger airbag and also glove compartment are directly connected. Hence no transverse support is required on the passenger-side. It has proved to be favourable to displace the passenger airbag in the direction of the front windscreen. Hence the assembly space above the glove compartment can be used as an additional storage compartment for receiving multimedia appliances etc.

When the passenger airbag is displaced towards the front windscreen, a symmetry between the driver- and passenger-side is also obtained so that e.g. the air channel can be configured as the same part for left-hand steering and right-hand steering.

There are several possibilities for connection of the air-conditioning unit. In the case of vehicle concepts with a screwed front wall mounting plate, the air-conditioning unit can be screwed directly onto the mounting plate. The air-conditioning unit is thereby connected to the instrument panel support only by means of blow moulded parts. The advantage of this variant resides in acoustic decoupling of the air-conditioning unit from the instrument panel support. Furthermore, the noise insulation in the low-frequency range is improved by the additional material connection on the front wall. In addition, the steering tripod is connected to the instrument panel support during pre-assembly. In this variant, front wall mounting plate, steering tripod and instrument panel support can be constructed as a module.

In the case of vehicle constructions with a welded front wall, the construction sequence changes. The air-conditioning unit is hereby fixed directly in the shell on the tripod and on the instrument panel support. In the pre-assembly, firstly the steering tripod is connected here to the air-conditioning unit. Thereafter, the instrument panel support is screwed onto both components. An entire module is produced in turn. In the vehicle, the steering tripod and also the air-conditioning unit is then screwed in.

The following problems arose in the steering wheel region from the idea of forming the bearing structure entirely in the top shell by means of plastic material ribs. Since the greatest stresses occur here, as a requirement for example of the shell alignment test, a stronger ribbing would be required here than in a normal instrument panel. This excessive reinforcement on the surface of the instrument panel would, in the case of a crash, lead to an excessive loading in the knee region. The case of repair presents a further problem. When dismantling the instrument panel support, the steering would no longer be fixed securely in the vehicle so that an additional steering support would also be necessary here, even if only in the case of repair.

Due to the tripod construction, the supporting structure is displaced in the region of the driver-side into the interior of the instrument panel. As a result, a free space is produced between tripod and instrument panel as a result of which, in the case of a crash, a certain penetration depth of the knees can be produced. It is conceivable furthermore to fix crash pads or knee airbags on the steering tripod.

The supporting structure is situated on the passenger-side out with the knee contact zone. The upper storage compartment and glove compartment are connected to each other and are fixed together on the air channel. As a result, the entire mass need no longer be absorbed by the instrument panel, as a result of which the ribbing can in turn be reduced.

One advantageous development provides that at least one strut is made of metal, plastic material or fibre-reinforced plastic material, in particular glass fibre-reinforced or carbon fibre-reinforced plastic material. For example glass fibre-reinforced plastic material is sensible hereby if the struts are disposed relatively close to the driver's seat since a pressure loading is effected here primarily in the region of the steering wheel in the axial direction thereof. In the case of struts which are displaced in the direction of the engine compartment, it is advantageous to configure these from metal in order to be able to absorb better any possible additional torsional forces. In addition, it is possible according to the configuration to produce the struts from an open or a closed profile, according to what torsional loading is accepted.

A particularly advantageous development provides that the support arrangement, in addition to or as an alternative to the steering column, also supports the pedals or a power brake. It is possible in addition that a head-up display (HUD) is provided in particular in the steering column mounting region, with which driver-relevant information can be projected directly onto the windscreen.

The construction of the support arrangement can vary. It is however basically sensible to provide diagonally extending struts for preference which meet in a steering column mounting region. The steering column mounting region can hereby be entirely configured in a rib-like or plate-like manner, preferably as a horizontal plate or a horizontal frame which can serve for example as support plate for the HUD. The connection to the window arch can be effected in turn via an additional mounting plate in order to achieve a particularly stable connection to the window arch. According to the embodiment, the initial points of the struts which are disposed on the steering column can meet together or be at a spacing from each other, for example a horizontal spacing of 3 cm to 30 cm can be present between the initial points (viewed from the strut centre).

An advantageous development provides that the automotive vehicle according to the invention contains an instrument panel support which is configured to be self-supporting. This instrument panel support, which is part of an instrument panel, is preferably connected to the support arrangement in order to increase stability. As a result of this self-supporting instrument panel support, it is possible for example to accommodate airbag or glove compartment on the passenger-side. A transverse support is unnecessary to support these components. In addition, it has proved to be convenient to displace the passenger airbag in the direction of the front windscreen relative to normal constructions. Hence the assembly space above the glove compartment which is likewise provided in the instrument panel support can be used as an additional storage compartment or for receiving multimedia appliances. It is particularly advantageous that a symmetry is created as a result between driver and passenger-side so that e.g. the air channel can be produced as the same part for left-side steering and right-side steering automotive vehicles.

In principle, in the case of vehicles according to the invention, for example a front wall which is welded to the shell of the automotive vehicle or also a front wall mounting plate which is screwed to the shell of the vehicle can be provided in order to separate the vehicle interior and the engine compartment.

It is hereby possible in the case of a screwed front wall to prefabricate practically all the components which are connected to the instrument panel (air-conditioning unit, support arrangement and also the front wall mounting plate itself and to incorporate them as a module "just in time" into the automotive vehicle.

In the case of a welded front wall, it is also possible to prefabricate a unit comprising the support arrangement according to the invention (with steering column, pedals etc.) and also an air-conditioning unit and instrument panel (including instrument panel support) and then to place them on the welded front wall. For example the attachment of the air-conditioning unit can hereby take place by form-fitting to the front wall and the attachment (in the longitudinal direction of the vehicle) can be effected by screwing together the instrument panel support with the shell. Between the air-conditioning unit and the instrument panel, preferably blow moulded parts are hereby provided which serve for tolerance compensation and noise decoupling.

A further advantageous development provides that the first and/or second strut, in its course in an X-, Y-, Z-coordinate system which is relative to the vehicle longitudinal axis (X-axis), vehicle vertical access (Z-axis) and vehicle side axis (Y-axis) in at least two coordinate directions, has an offset of more than 8 cm, preferably more than 10 cm, particularly preferably more than 20 cm. Reference is made herewith therefore to the fact that these struts extend "diagonally". As a result, a better force absorption is made possible, in particular torsion of the support arrangement is extensively prevented during loading of the steering column in the Z-direction. It has been shown that, as a result of the gain in stability, the support arrangement can be constructed even closer to the front wall (i.e. away from the vehicle occupants). As a result, knee-room is again obtained or impact by the knees of the occupants becomes less likely.

A further advantageous development provides that the spacing of the initial points of the struts in the region of the longitudinal column is between 3 and 30 cm, preferably between 15 and 30 cm. As a result, very stable accommodation is ensured, on the one hand, by the diagonal struts, on the other hand, the HUD can be received easily in the region between the initial points. Correspondingly, the pedals can also be received easily on the underside.

A further advantageous development provides that, in the knee impact region of the automotive vehicle, the spacing between the struts and the side of the instrument panel which is orientated towards said struts is at least 40 mm. There is hereby understood by "knee impact region", the entire region of the instrument panel, from the underside of the longitudinal column exit downwards. Alternatively or additionally, it is possible that, over the full length of the struts, the minimum spacing towards the facing surface of the instrument panel is at least 40 mm. There is hereby understood by "full length", the merely slightly curved or un-bent portion of the respective strut (i.e. the length of the strut, apart from a possibly "bent-over" end region).

A further advantageous development provides that the support arrangement in the region of the longitudinal column, starting from the struts, has two lateral plates for connection to the window arch, the space enclosed by plates and window arch being the receiving space for the projection device of the HUD. These "plates" can hereby be freely projecting plates or also part of an upwardly "open" cuboid. It is important that a protective space for the HUD is produced here. This should be free at the top for beam guidance.

A further advantageous development provides that a longitudinal column fixing is flat in the region of the initial points of the struts. This fixing fixes the longitudinal column in a translatory manner at this location, of course not axially in the direction of rotation of the steering.

A further advantageous development provides that the pedals are mounted on the underside of the support arrangement. The pedals are hereby mounted preferably between the lateral plates (which effect the connection of the support arrangement to the window arch).

One advantageous development provides that the transverse support is continuous from the region of the left A-column of the automotive vehicle to the region of the right A-column of the automotive vehicle. However it is also possible as an alternative that the transverse support extends merely in regions (also preferably on the driver-side). A so-called "tripod" can hereby be provided. This offers a transverse support "in regions" which serves for example for connection of the pedals and steering wheel and which is supported laterally by struts on the A-column or on the central console.

A further advantageous development provides that two support elements are provided which connect the transverse support and the window arch or the front wall situated thereunder. These support elements preferably have a plate-shaped configuration. In this way, they can be welded easily to the transverse support or inserted into the latter, an angling-off, in regions, of the support elements can easily be provided likewise. The support elements can in addition have cut-outs for receiving retaining plates. These "retaining plates" can however also be provided as integral components of the support elements.

Preferably the retaining plate and the projection device of the HUD have complementary recesses or projecting portions which enable a floating mounting of the projection device. For example elastomer blocks can be provided on the retaining plate which engage in a form-fitting manner into rail-like depressions of the projection device. Fixing is consequently possible with five degrees of freedom (all the degrees of freedom up to the movement direction in the rail direction). This rail direction is preferably the X-axis which is orientated in the vehicle longitudinal direction. The final fixing in the X-axis is then effected by the engine compartment-side fixing of the projection device on the window arch. Vibration damping of the projection device is provided by mounting on elastomer blocks. Corresponding vibration damping can be provided also in the region of the mounting of the projection device to the window arch.

The support elements can, on the one hand, be mounted on the window arch and, on the other hand, also in addition on components of the body which are situated below the window arch, for example on a front wall situated there or also on the A-columns of the automotive vehicle body. This mounting is effected preferably via riveting or screwing. However it is also possible to provide a clip here with complementary catching elements. It is however problematic here that the fixing must in every case be strong enough to ensure a problem-free long term operation. For this reason, preferably pin-like rotatable mounting means should be provided (preferably a screw or corresponding pintle). Preferably the window arch is also configured as a hollow body which correspondingly has aligned openings for guiding through pin-like mounting means. For this purpose, preferably larger openings are provided also towards the engine compartment so that the screw connection can be implemented more easily by the operator.

A particular continuation of the instrument panel module provides that the latter already has an instrument panel cover, i.e. final assembly of the instrument panel cover need not be effected again subsequently. It is merely important that an opening or recess is provided for directing through a light beam from the projection device of the HUD to the windscreen.

BRIEF DESCRIPTION OF DRAWINGS

The invention is now explained with reference to several Figures, in which there are shown.

DETAILED DESCRIPTION

Figure 1:
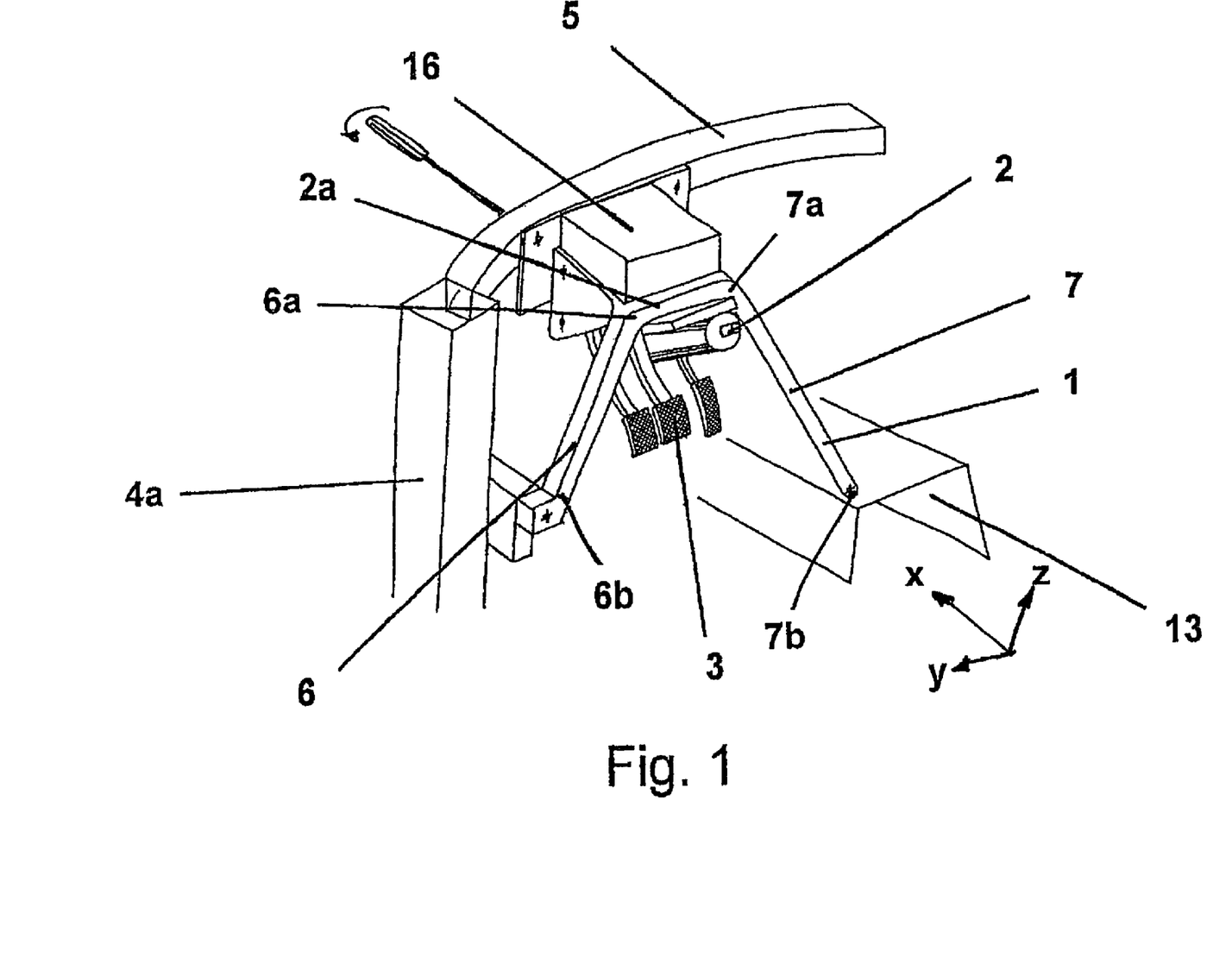
FIG. 1 shows a support arrangement according to an exemplary embodiment of the present invention.

FIG. 1 shows a part of an automotive vehicle with a support arrangement 1 according to the invention. This support arrangement is mounted on a window arch 5 with a mounting plate associated therewith, said window arch extending below a windscreen in the region between the two A-columns of the automotive vehicle. A coordinate system is shown respectively in the Figures for easier orientation. The X-axis hereby points in the longitudinal direction of the vehicle, the Y-axis in the lateral direction of the vehicle and the Z-axis in the vertical axis direction of the vehicle.

The support arrangement 1 has a first strut 6 and a second strut 7 in order to replace a transverse support which is additional to the window arch, as is common in vehicles according to the state of the art. The initial points of the struts 6 and 7 are accommodated in the region of a steering column 2 (i.e. in the "steering column mounting region 2a") (the highest situated points of the diagonal struts are regarded as initial points). The initial point of the strut 6 is hereby designated with 6a, the end point of the strut 6 with 6b. The initial point of the strut 7 is designated with 7a, the end point of the strut 7 with 7b. A horizontal portion of 30 cm length is hereby provided between the initial points of the first and of the second strut in order to provide foot room for pedals 3 which are likewise mounted in the steering column region 2a. The initial point of the first strut 6 is in the steering column mounting region 2a or in the region of the steering column 2 and the end point of the first strut is in the region of the driver-side A-column 4a, the strut here being connected to a longitudinal support which is connected to the driver-side A-column. In addition, the strut has a bend in its end region (not absolutely necessarily).

The second strut has its initial point likewise in the region of the steering column 2 (steering column mounting region 2a) and extends diagonally towards the central console 13 where the end point of the second strut is situated.

It may be added that it is not absolutely necessary for the first strut 6 and the second strut 7 to be produced physically from two components. It would also be adequate to provide a "continuous" strut.

The support arrangement according to the invention is quasi a "tripod" since firstly a connection to the region of the driver-side A-column is provided, secondly a connection to the central console and thirdly a connection to the window arch 5. The configuration of the support arrangement is furthermore relatively arbitrary as long as these three engagement points are provided and the support arrangement per se is provided (without providing the support function in the passenger area).

The struts 6 and 7 are available manufactured from metal and from a closed rectangular profile. The connection of the support arrangement to the window arch or to the remaining components is effected presently by screw connection, of course also other connections, for example by welding, gluing are possible.

A surface on which an HUD 16 is mounted is shown on the upperside of the support arrangement 1. Abutting on this surface, the mounting plate to the window arch 5 is then provided, which plate is provided with screw holes which can be detected in FIG. 1. Alternatively, power brakes etc. can be mounted in addition on the support arrangement according to the invention.

Figure 2:
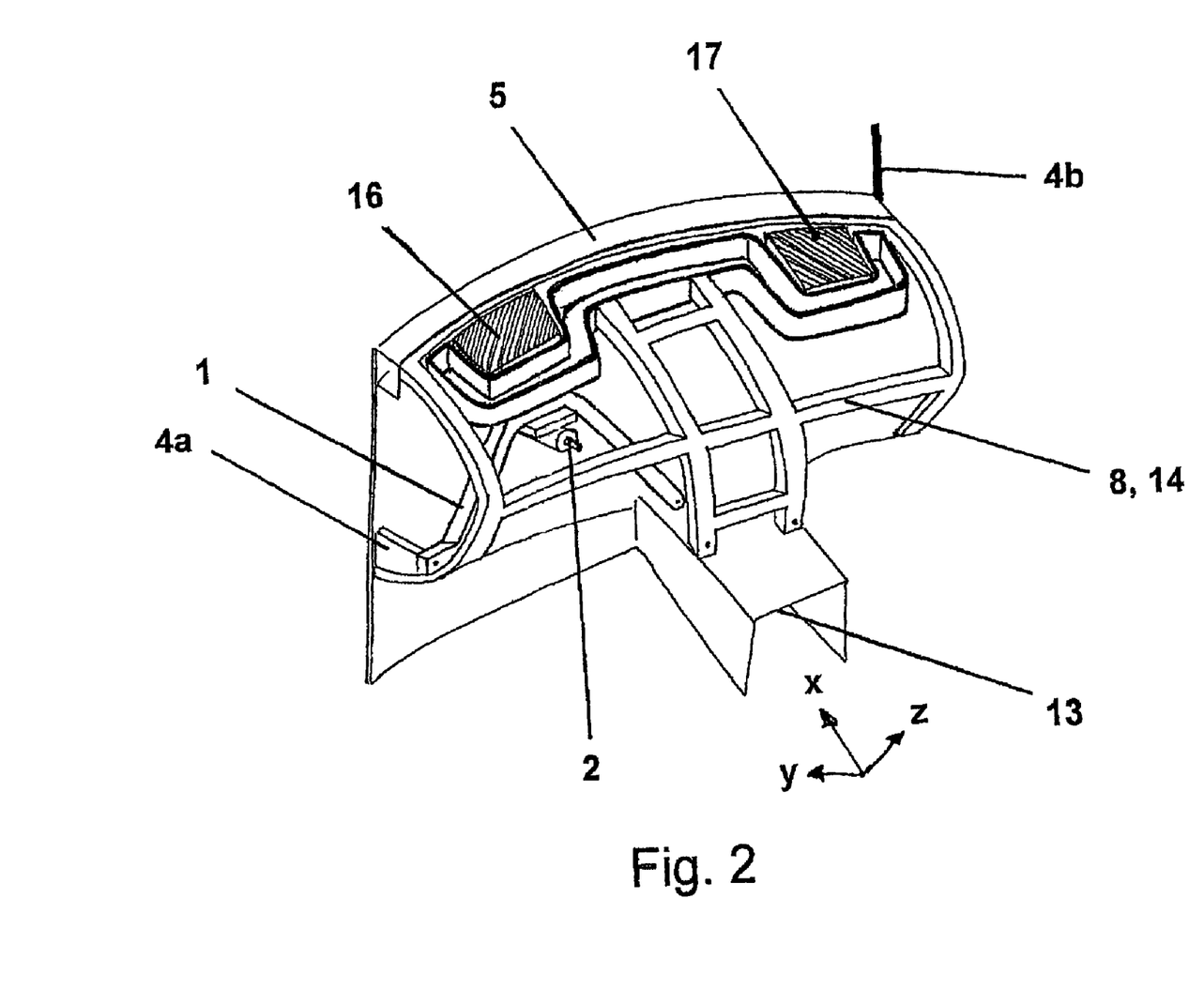
FIG. 2 shows the support arrangement of FIG. 1 with an instrument panel support situated thereabove.

FIG. 2 shows the support arrangement 1 according to the invention from FIG. 1, however the latter being connected still to an instrument panel support 8. The instrument panel support 8 hereby belongs to an instrument panel 14 (see for example FIGS. 3 and 4). For reasons of clarity, the support structure alone is represented. It can be seen that the HUD 16 is mounted in the driver area, whereas a passenger airbag 17 is provided on the passenger-side (i.e. in the region of the passenger-side A-column 4b). On the instrument panel support, a glove compartment or multimedia appliances can also be mounted in addition to the passenger airbag.

The assembly for various vehicle concepts is presented in the following with reference to FIGS. 3 and 4.

Figure 3:
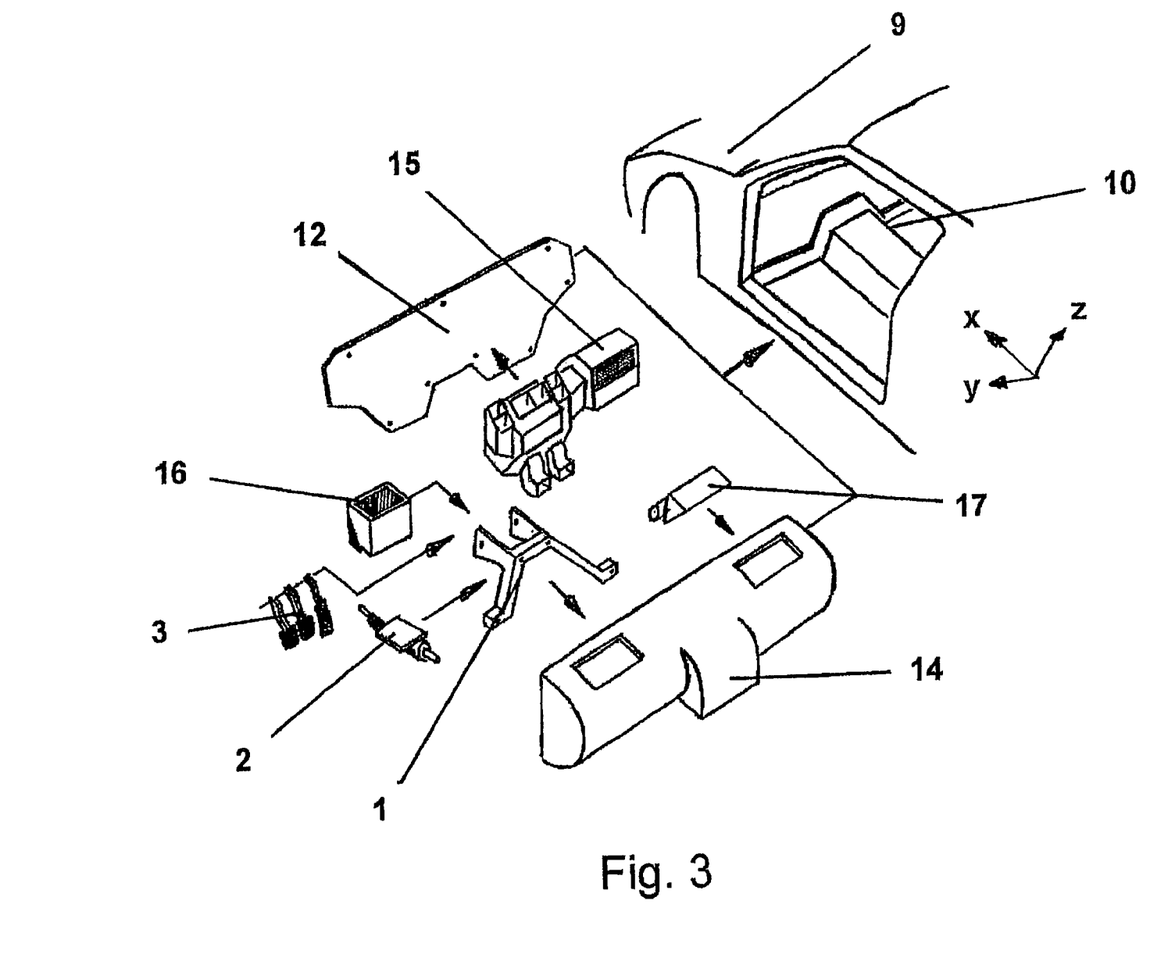
FIG. 3 shows an assembly diagram for an automotive vehicle with a screw-connected front wall.

FIG. 3 hereby shows a shell of the automotive vehicle, a front wall mounting plate 12 which can be screwed to the shell of the vehicle being shown for separating the vehicle interior 10 and the engine compartment 9. During assembly, a steering column 2, pedals 3 and also HUD 16 are connected to a support arrangement according to the invention and subsequently to an instrument panel 14, this instrument panel being provided in addition with a passenger airbag 17. In addition, an air conditioning module 15 is connected to a front wall mounting plate 12. Before the front wall mounting plate is screwed to the shell of the automotive vehicle, there takes place joining of the elements which are mounted on the instrument panel to the front wall mounting plate so that these assembled elements can then be inserted into the shell as a complete module.

Figure 4:
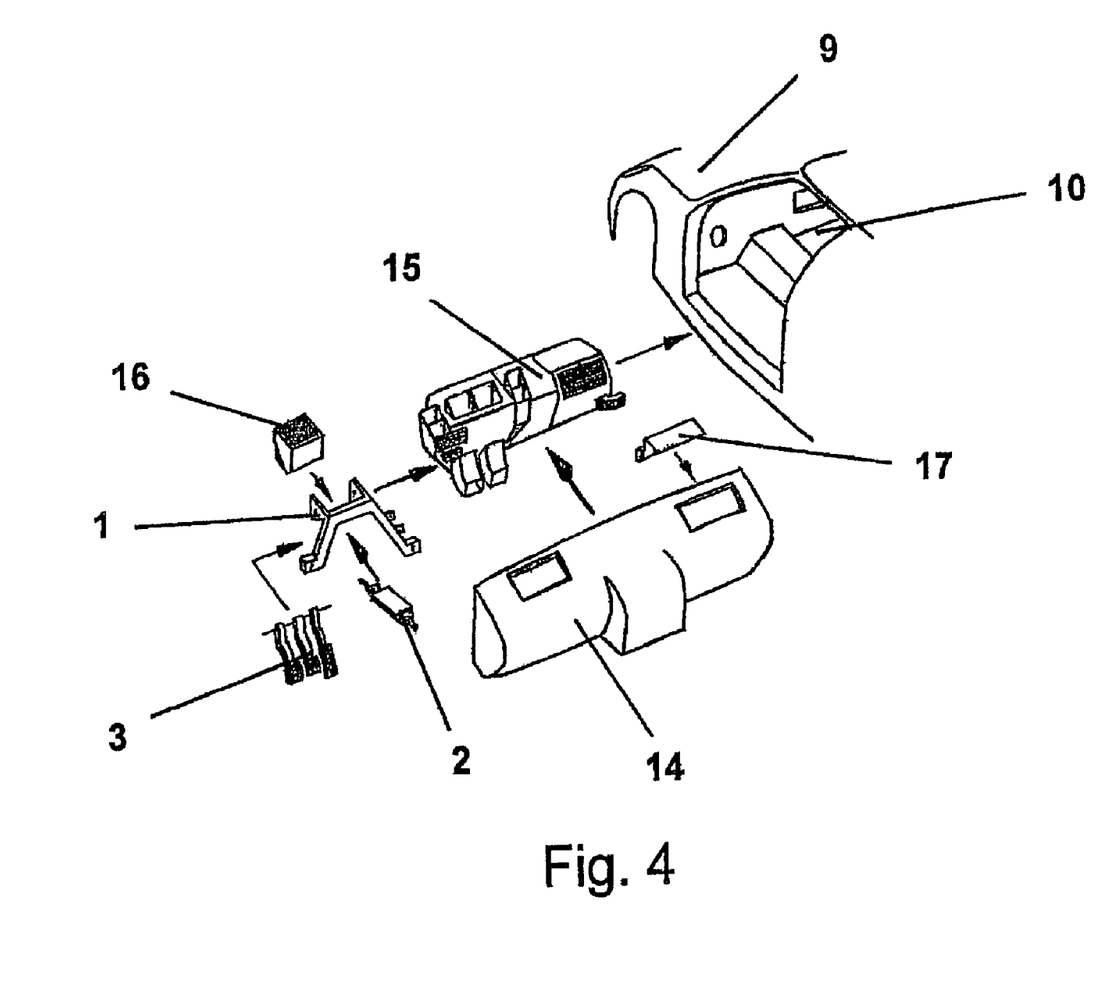
FIG. 4 shows an assembly diagram for vehicles with a welded front wall.

FIG. 4 shows the case where a front wall 11 which is welded to the shell of the automotive vehicle is provided for separating the interior 10 and the engine compartment 9. A support arrangement 1 according to the invention is hereby connected in turn to a steering column 2 and pedals 3 and for example to a head-up display 16 and subsequently to an air conditioning unit module 15 which is then provided in turn (via blow moulded parts made of plastic material) with an instrument panel 14. Subsequently these parts are connected to the shell of the automotive vehicle, the air conditioning unit module 15 being introduced in a form-fitting manner into the welded front wall 11 and being fixed in addition to the shell in the longitudinal direction of the vehicle by screwing to the instrument panel so that a secure support is produced.

The portrayed embodiments are not intended to restrict the protective scope of the invention. In particular the embodiment of the support arrangement 1 according to the invention can vary (above all as far as the configuration of the steering column mounting region 2a is concerned) (for example whether the latter is provided with a mounting plate or has a flat configuration).

FIGS. 1 to 4 respectively show the support arrangement according to the invention, the so-called "tripod". It is hereby essential that the latter enables optimum force absorption, on the one hand, because of its diagonal struts. On the other hand, an installation space is created by the spaced initial points of the struts and, on the one hand, enables easy fitting of the pedals between the two protruding plates and in addition securely accommodates the HUD 16 also in this region.

Figure 5:
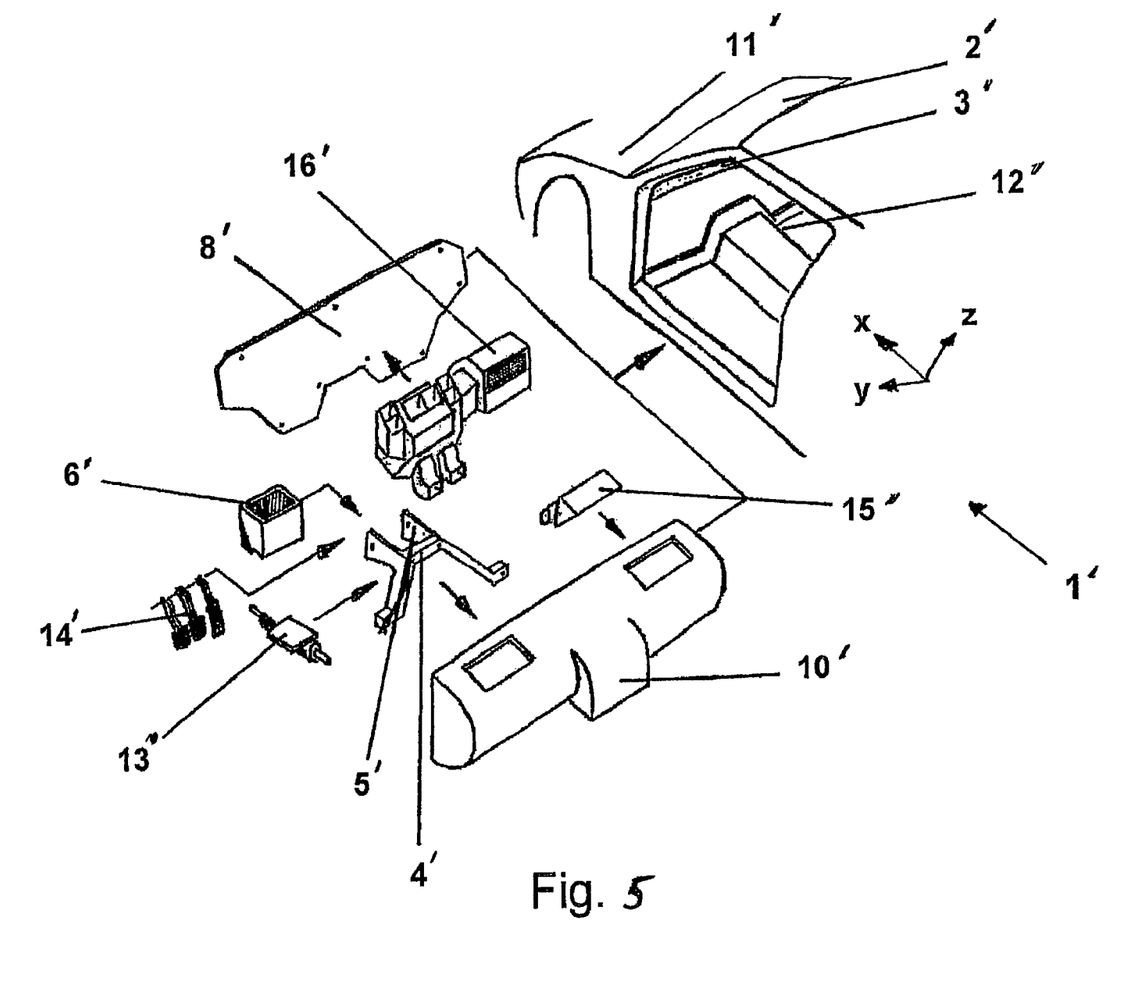
FIG. 5 shows an exploded view of an automotive vehicle according to an exemplary embodiment of the present invention.

FIG. 5 shows a shell of an automotive vehicle, a front wall mounting plate 8' which can be screwed to the shell of the vehicle in order to separate the vehicle interior 12' and the engine compartment 11 being shown. During assembly, a steering column 13', pedals 14' and a projection device 6' are connected to a transverse support or to a support arrangement in the form of a "tripod" which contains a transverse support 4' at least in portions and subsequently is connected to an instrument panel 14', this instrument panel being provided in addition with a passenger airbag 15'. In addition, an air-conditioning unit module 16' is connected to the front wall mounting plate. Before the front wall mounting plate is screwed to the shell of the vehicle, there takes place joining of the element which is mounted on the instrument panel to the front wall mounting plate so that a complete instrument panel module can be inserted into the shell. After inserting the instrument panel module into the shell, the projection device 6' is then screwed to the window arch 3' from the engine compartment 11'. Above the window arch 3', a windscreen 2' which likewise pertains to the automotive vehicle 1' is provided.

In the following, the mounting of the projection device 6' in the region of the transverse support 4', of support elements 5' and also of the window arch 3' is dealt with in more detail.

Figure 6:
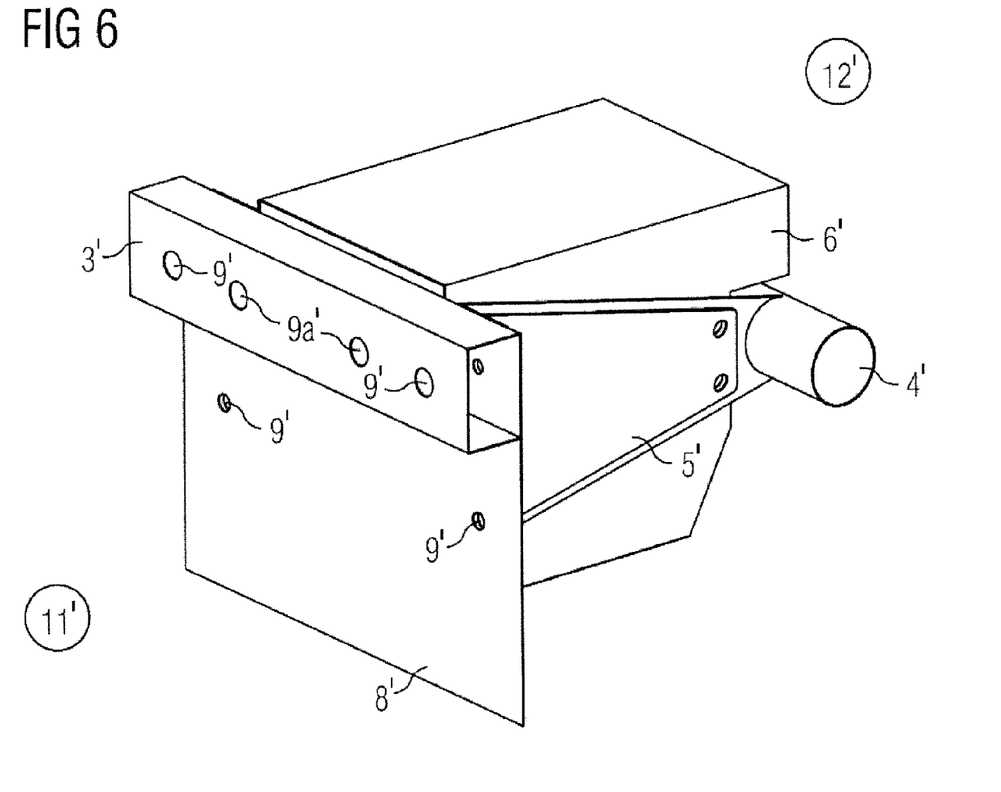
FIGS. 6 and 7 show detailed views of a projection device of a head-up display, and FIG. 8 show installation of the projection device in an instrument panel module.

FIG. 6 shows a detailed view of the region of the projection device 6' from the engine compartment 11'. There can hereby be seen the window arch 3' and the rear side of the front wall (or front wall mounting plate) 8'. A plurality of openings 9' for guiding through mounting bodies is provided on this rear side. The openings 9' hereby serve for guiding through screws which fix support elements 5' on the window arch or on the end wall 8'. In addition, openings are provided with which screwing of the projection device 6' on the window arch 3' is effected (these openings are designated with the reference number 9a').

The support elements 5' (the rear support element is covered by the projection device 6') connect the transverse support 4', i.e. in the screwed state, to the window arch 3' or in addition to the front wall 8'. It may be stressed again that the transverse support 4' shown here need only be part of a tripod by way of example (see FIG. 5), it is of course equally possible to provide a continuous transverse support which extends from the left to the right A-column of an automotive vehicle.

In the overall view of the Figures, an automotive vehicle 1' is therefore shown, containing a windscreen 2', a window arch 3' which extends below the windscreen and also a transverse support 4' which extends at least in regions over the vehicle width, the transverse support being able to be connected via at least one support element 5' to the window arch 3' of the automotive vehicle 1', a projection device 6' of a head-up display (HUD) being provided in the intermediate space between transverse support and window arch and the window arch 3' having recesses (for example openings) of such a type that the projection device 6' of the HUD can be fixed to the window arch 3' from the engine compartment of the automotive vehicle 1'.

FIG. 7 again shows a view of the detail from FIG. 6 from the vehicle interior side 12'. The transverse support 4' can hereby be easily detected, said transverse support having a hollow cross-section and the support elements 5' being fitted thereon.

Figure 8:
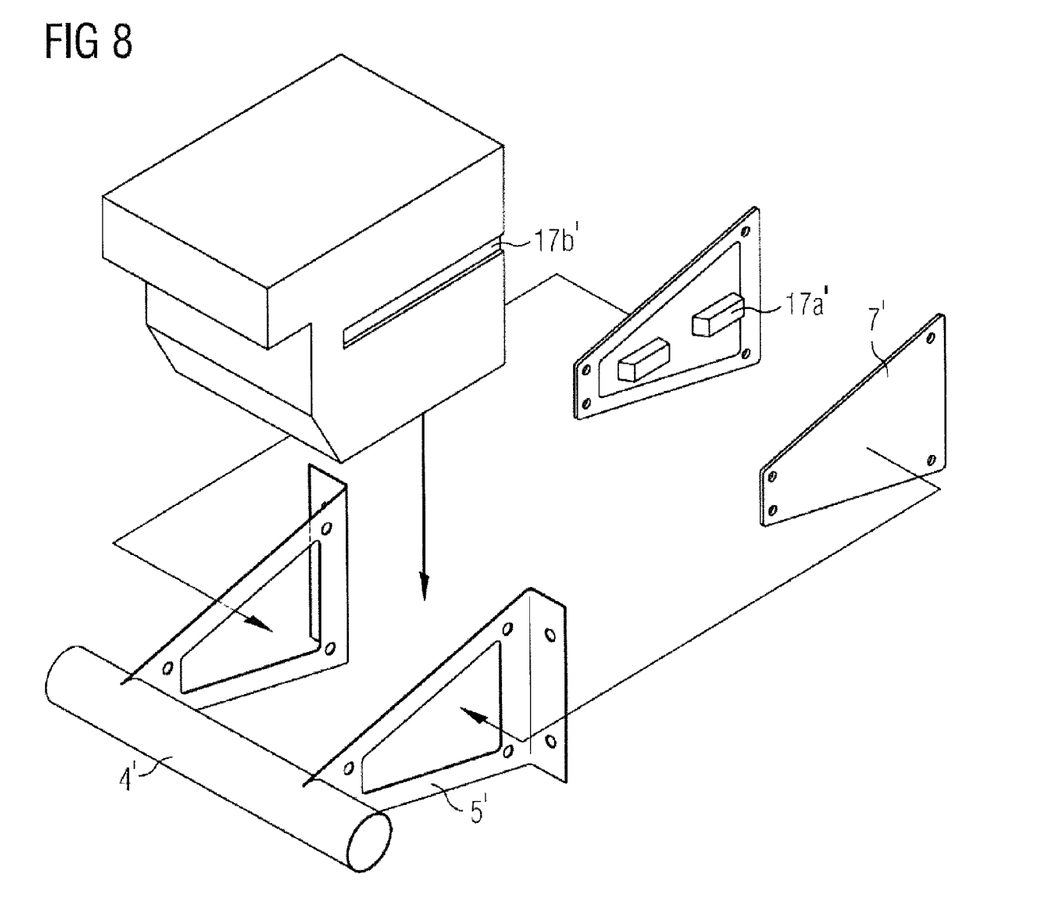

FIG. 8 now shows the sequence of the assembly in the region of the detail shown in FIG. 2 or 3. This assembly is effected during the pre-assembly of an instrument panel module.

As can be seen in FIG. 8, the transverse support 4' has two support elements 5' connected thereto (in the present example projecting at right angles), between which the projection device 6' of the HUD can be inserted. The support elements 5' are hereby firmly connected to the transverse support 4' (for example welded). The support elements 5' have cut-outs into which, after introduction of the projection device 6', retaining plates 7' respectively can be introduced from the exterior sides. These retaining plates have elastomer blocks 17a' which engage on both sides into corresponding and complementary rails 17b' of the projection device. The retaining plates 7' then are screwed to the support elements 5' so that the projection device 6' is substantially fixed. There is meant by "substantially fixed" that a minimal oscillation is still possible (which is damped by the elastomer blocks). In addition, reference should made to the fact that the rail 17b' is open towards the right side, but has a shoulder towards the left side. As a result it is therefore not possible for the projection device to slide out of the pre-assembled instrument panel module.

The projection device 6' can be wired already electrically to the remaining instrument panel module after this pre-assembly and can already be metrologically tested so that merely the mechanical connection is necessary during final assembly.

The final assembly can be effected after the pre-assembly shown in FIG. 4. Firstly screws are hereby guided through the openings 9' which enable screwing of the support elements to the window arch 3' or to the front wall 8'. The four screws shown here should be understood however merely by way of example. Subsequently the fixing of the projection device 6' to the window arch is effected, the recesses 9a' being used hereby for guiding through the screws. Here also, the two screw holes should be understood merely as a number by way of example. In each case, aligned openings are provided in the window arch and enable the mounting means to be guided through and fixed at the rear.

Preferably screws are used as mounting means. It is of course however also possible to provide corresponding pintles, rotatable shells, rivets or also complementary catching elements.

Figure 7:
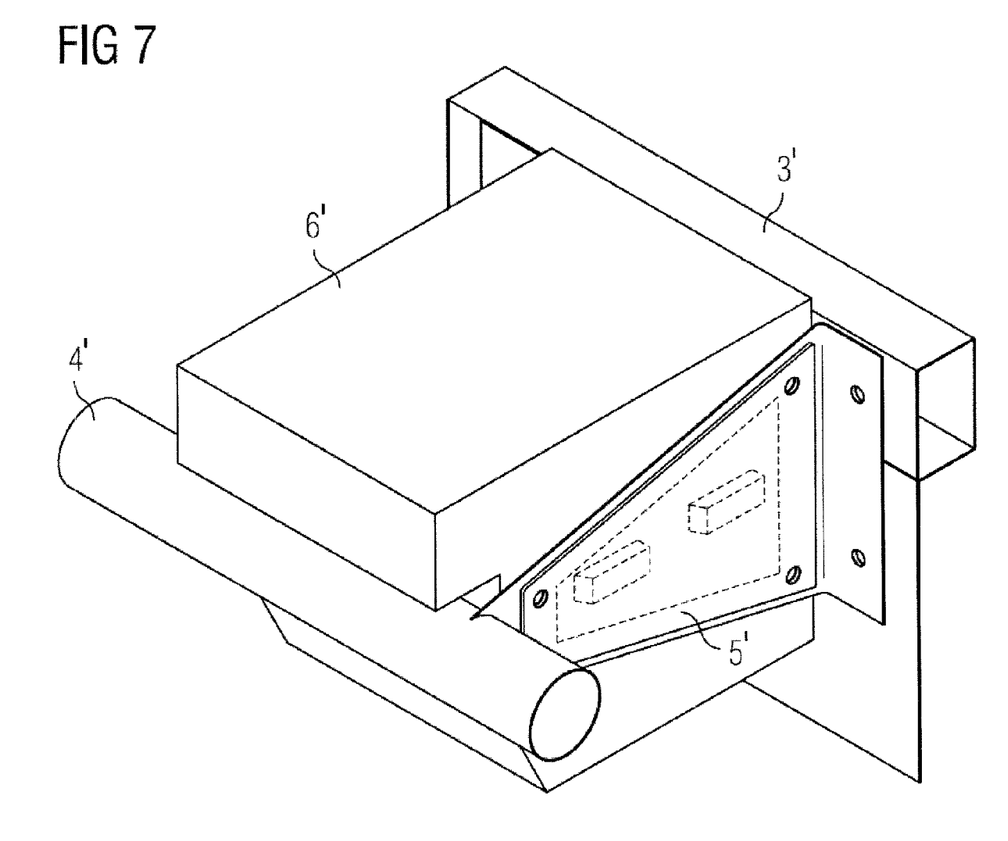

An important aspect is that the elements shown in FIG. 6 to 8 are part of a pre-manufactured instrument panel module which is then connected in the final assembly to the shell or to the window arch. This instrument panel module preferably already has an instrument panel cover, the latter having an opening for directing through a light beam from the projection device to the windscreen.

During the corresponding assembly, as cited already above, firstly the instrument panel module which contains the projection device is pre-assembled (see in particular FIG. 8) and subsequently the module is connected securely to the window arch and/or to further parts of the body and in addition the projection device of the HUD is connected to the window arch, from the engine compartment, by mounting means.

For this purpose, it is particularly important that the projection device 6' has a mounting receiving means/mounting device on its side which is orientated away from the transverse support (i.e. orientated away from the interior), said mounting receiving means/mounting device being connected in a form-fitting and frictional manner to the window arch by engagement from the engine compartment.

The invention claimed is:

1. An automotive vehicle, comprising:
    a support arrangement supporting at least one of a steering column and pedals,
    a window arch extending below a windscreen in a region between two outer A-columns of the automotive vehicle; and
    at least one of a self-supporting instrument panel support, a front wall welded to a shell of the vehicle, and a front wall mounting plate screwed to the shell to separate a vehicle interior and the engine compartment,
    wherein the support arrangement includes a first strut and a second strut in order to replace a transverse support which is additional to the window arch, initial points of the first and second struts being disposed in a region of the steering column, a first end point of the first strut being situated in a region of a driver-side A-column and a second end point of the second strut in a region of a central console,
    wherein the support arrangement is mounted on the window arch from an engine compartment of the automotive vehicle, and
    wherein at least one of a passenger airbag and a glove compartment is connected directly to the instrument panel support.

2. An automotive vehicle, comprising:
    a support arrangement supporting at least one of a steering column and pedals,
    a window arch extending below a windscreen in a region between two outer A-columns of the automotive vehicle; and
    at least one of a self-supporting instrument panel support, a front wall welded to a shell of the vehicle, and a front wall mounting plate screwed to the shell to separate a vehicle interior and the engine compartment,
    wherein the support arrangement includes a first strut and a second strut in order to replace a transverse support which is additional to the window arch, initial points of the first and second struts being disposed in a region of the steering column, a first end point of the first strut being situated in a region of a driver-side A-column and a second end point of the second strut in a region of a central console, wherein the support arrangement is mounted on the window arch from an engine compartment of the automotive vehicle, and wherein an air-conditioning unit module is fitted directly to the front wall mounting plate.

3. An automotive vehicle, comprising:

a support arrangement supporting at least one of a steering column and pedals, and a window arch extending below a windscreen in a region between two outer A-columns of the automotive vehicle, wherein the support arrangement includes a first strut and a second strut in order to replace a transverse support which is additional to the window arch, initial points of the first and second struts being disposed in a region of the steering column, a first end point of the first strut being situated in a region of a driver-side A-column and a second end point of the second strut in a region of a central console, wherein the support arrangement is mounted on the window arch from an engine compartment of the automotive vehicle, wherein at least one of the first and second struts is made of one of a glass fiber-reinforced plastic material and a carbon fiber-reinforced plastic material wherein the support arrangement in the region of the steering column, starting from the first and second struts, has two lateral support elements for connection to the window arch, the space enclosed by plates and the window arch being a receiving space for the projection device of the HUD, and wherein the pedals are mounted between the lateral support elements.

4. An automotive vehicle, comprising:

a windscreen;

a window arch extending below the windscreen;

a transverse support extending at least in regions across a width of the vehicle, the transverse support being connected via at least one support element to the window arch; and a head-up device (HUD) including a projection device situated in an intermediate space between the transverse support and window arch, wherein the projection device is fixed on the window arch from an engine compartment of the vehicle.

5. The automotive vehicle according to claim 4, wherein the transverse support is continuous from a first region of a left A-column of the vehicle to a second region of a right A-column of the vehicle.

6. The automotive vehicle according to claim 4, wherein the transverse support extends over a region on a driver-side.

7. The automotive vehicle according to claim 4, wherein the at least one support element includes two support elements, the projection device being fitted between the two support elements.

8. The automotive vehicle according to claim 4, wherein the at least one support element has a plate-shaped configuration.

9. The automotive vehicle according to claim 4, wherein the at least one support element has a cut-out for fixing retaining plates.

10. The automotive vehicle according to claim 9, wherein the retaining plates and the projection device have complementary recesses and projecting portions for floating mounting of the projection device relative to the retaining plates.

11. The automotive vehicle according to claim 4, wherein the at least one support element is fixed on the window arch and a front wall, the front wall being situated below the window arch.

12. The automotive vehicle according to claim 4, wherein the projection device is one of (i) clipped to the window arch and (ii) screwed on via at least one mounting arrangement.

13. The automotive vehicle according to claim 12, wherein the at least one mounting arrangement includes a screw.

14. The automotive vehicle according to claim 12, wherein the window arch has a hollow cross-section having aligned openings for guiding through the at least one mounting arrangement.

15. The automotive vehicle according to claim 4, wherein the transverse support, the at least one support element, and the projection device are included in a pre-assembled instrument panel module.

16. An instrument panel module for an automotive vehicle, comprising:

a transverse support extending at least in regions across a width of the vehicle;

a support element being connected to a window arch of the vehicle and a projection device of an HUD, and a mounting device connecting the projection device to the window arch, the mounting device being situated on a side of the projection device which is orientated away from the transverse support.

17. The instrument panel module according to claim 16, wherein the instrument panel module is pre-assembled.

18. The instrument panel module according to claim 17, further comprising:

an instrument panel cover; and at least one opening directing through a light beam from the projection device to the windscreen.

19. A method for assembling an automotive vehicle, a body of the vehicle including a window arch below a region of a windscreen which is to be mounted and an instrument panel module being provided for pre-assembly of a projection device of an HUD, comprising:

securely connecting the instrument panel module to at least one of the window arch and further parts of the body; and connecting the projection device to the window arch from an engine compartment of the vehicle using a mounting arrangement.

20. The method according to claim 19, wherein the mounting arrangement includes at least one of at least one screw, at least one rivet, and complementary catching elements.

* * * * *